US009870403B1

(12) United States Patent
Teng et al.

(10) Patent No.: US 9,870,403 B1
(45) Date of Patent: Jan. 16, 2018

(54) ESTIMATING SOCIAL CONTENT INTERACTIONS

(71) Applicant: Google Inc., Mountain View, CA (US)

(72) Inventors: Junbin Teng, Cupertino, CA (US); Alessandra Mazzia, Sunnyvale, CA (US); Chih-Wei Chen, Sunnyvale, CA (US); Anja Hauth, Zurich (CH); Pascal Tom Getreuer, San Francisco, CA (US)

(73) Assignee: Google LLC, Mountain View, CA (US)

( * ) Notice: Subject to any disclaimer, the term of this patent is extended or adjusted under 35 U.S.C. 154(b) by 176 days.

(21) Appl. No.: 14/191,354

(22) Filed: Feb. 26, 2014

(51) Int. Cl.
| G06F 17/30 | (2006.01) |
| G06F 7/00 | (2006.01) |
| G06F 17/22 | (2006.01) |
| G06F 17/18 | (2006.01) |
| G06Q 30/02 | (2012.01) |

(52) U.S. Cl.
CPC ........ G06F 17/30528 (2013.01); G06F 17/18 (2013.01); G06F 17/2247 (2013.01); G06F 17/30353 (2013.01); G06Q 30/0202 (2013.01); G06Q 30/0282 (2013.01)

(58) Field of Classification Search
CPC . G06Q 30/0202; G06Q 30/0282; G06F 17/18
See application file for complete search history.

(56) References Cited

U.S. PATENT DOCUMENTS

| 8,606,792 | B1* | 12/2013 | Jackson | G06F 17/30699 707/748 |
| 9,122,989 | B1* | 9/2015 | Morris | G06Q 30/02 |
| 2006/0242554 | A1* | 10/2006 | Gerace | G06F 17/30867 715/209 |
| 2011/0231390 | A1* | 9/2011 | Inagaki | G06F 17/30864 707/721 |
| 2011/0302103 | A1* | 12/2011 | Carmel | G06Q 30/0282 705/347 |
| 2014/0095509 | A1* | 4/2014 | Patton | G06F 17/30241 707/740 |

* cited by examiner

*Primary Examiner* — Marc Somers
(74) *Attorney, Agent, or Firm* — McDermott Will & Emery LLP

(57) ABSTRACT

Techniques for estimating social content interactions are provided. An example method includes determining counts of one or more user interactions with one or more content items created by an author, each user interaction of the one or more user interactions having an associated time, classifying, based on respective associated times of the user interactions, the determined counts of the user interactions with the content items into predetermined time intervals spanning a first duration, computing an engagement model for the author based on the classified counts corresponding to the predetermined time intervals and a number of the content items created by the author and estimating, at a particular time for a second duration, a number of interactions with a particular content item created by the author based on the engagement model and a determined actual number of interactions with the particular content item.

5 Claims, 6 Drawing Sheets

User 1 – Male, Age 25, 500 friends
User 2 – Female, Age 27, 100 friends
User 3 – Female, Age 30, 1000 friends Feature Score Matrix 382

| | Is Male | Is Female | Age | NumFriends |
|---|---|---|---|---|
| User 1 | 1 | 0 | 25 | 500 |
| User 2 | 0 | 1 | 27 | 100 |
| User 3 | 0 | 1 | 30 | 1000 |

384A (P_affinity(U))

| | |
|---|---|
| User 1 | 0.8 |
| User 2 | 1.2 |
| User 3 | 1.4 |

384B (P_popularity(U))

| | |
|---|---|
| User 1 | 1.1 |
| User 2 | 0.7 |
| User 3 | 0.6 |

384C (P_freshness(U))

| | |
|---|---|
| User 1 | 0.6 |
| User 2 | 1.1 |
| User 3 | 1.2 |

FIG. 3

ESTIMATING SOCIAL CONTENT INTERACTIONS

BACKGROUND

The present disclosure relates generally to software applications and particularly to user interface elements in such applications. Certain web-based applications provide information in the form of posts authored by a variety of users. These posts can be broadcasted by populating social content streams. The posts may be typically presented in reverse chronological order on the streams, but such an arrangement of posts may not prioritize the most informative or useful information when presented to a reader of the posts.

SUMMARY

The disclosed subject matter relates to estimating social content interactions.

In some innovative implementations, the disclosed subject matter can be embodied in a method. The method comprises determining counts of one or more user interactions with one or more content items created by an author, each user interaction of the one or more user interactions having an associated time, classifying, based on respective associated times of the user interactions, the determined counts of the user interactions with the content items into predetermined time intervals spanning a first duration, computing an engagement model for the author based on the classified counts corresponding to the predetermined time intervals and a number of the content items created by the author, determining, at a particular time in the first duration, an actual number of interactions with a particular content item created by the author and estimating, at the particular time for a second duration, a number of interactions with the particular content item created by the author based on the engagement model and the determined actual number of interactions with the particular content item.

The user interactions can include a user reading the particular content item, the user selecting the particular content item, the user sharing the particular content item, the user commenting on the particular content item, or the user endorsing the particular content item. The second duration can be read from a memory, where the second duration corresponds to a time duration beyond which additional interactions with the particular content item are anticipated to end.

The computing of the engagement model for the author comprises dividing the classified counts corresponding to the predetermined time intervals by a number of the content items created by the author. The number of content items created by the author can be read from a user account of the author from a social data repository.

The method further comprises determining, at another time in the first duration following the particular time, an updated actual number of interactions with a particular content item created by the author and estimating, at the another time for the second duration, an updated number of interactions with the particular content item created by the author based on the engagement model and the determined updated actual number of interactions with the particular content item.

The method also comprises computing a popularity score for the particular content item based on the estimated number of interactions, determining a display location of the particular content item in a displayed social content stream based on the popularity score, and providing the particular content item for display in the social content stream based on the determined display location.

In some innovative implementations, the disclosed subject matter can be embodied in a machine readable medium. The machine readable medium includes instructions, which when executed by a processor, cause the processor to perform operations comprising determining counts of one or more user interactions with one or more content items created by an author, each user interaction of the one or more user interactions having an associated time, classifying, based on respective associated times of the user interactions, the determined counts of the user interactions with the content items into predetermined time intervals spanning a first duration, computing an engagement model for the author based on the classified counts corresponding to the predetermined time intervals and a number of the content items created by the author, determining, at a particular time in the first duration, an actual number of interactions with a particular content item created by the author and estimating, at the particular time for a second duration, a number of interactions with the particular content item created by the author based on the engagement model and the determined actual number of interactions with the particular content item.

The user interactions can include a user reading the particular content item, the user selecting the particular content item, the user sharing the particular content item, the user commenting on the particular content item, or the user endorsing the particular content item. The second duration can be read from a memory, where the second duration corresponds to a time duration beyond which additional interactions with the particular content item are anticipated to end.

The computing of the engagement model for the author comprises dividing the classified counts corresponding to the predetermined time intervals by a number of the content items created by the author. The number of content items created by the author can be read from a user account of the author from a social data repository.

The machine readable medium further includes instructions, which when executed by the processor, cause the processor to perform operations comprising determining, at another time in the first duration following the particular time, an updated actual number of interactions with a particular content item created by the author and estimating, at the another time for the second duration, an updated number of interactions with the particular content item created by the author based on the engagement model and the determined updated actual number of interactions with the particular content item.

The machine readable medium further includes instructions, which when executed by the processor, cause the processor to perform operations comprising computing a popularity score for the particular content item based on the estimated number of interactions, determining a display location of the particular content item in a displayed social content stream based on the popularity score, and providing the particular content item for display in the social content stream based on the determined display location.

In some innovative implementations, the disclosed subject matter can be embodied in a system. The system comprises a memory comprising instructions and a processor configured to execute the instructions to determine counts of one or more user interactions with one or more content items created by an author, each user interaction of the one or more user interactions having an associated time, classify, based on respective associated times of the user interactions, the determined counts of the user interactions with the content items into predetermined time intervals spanning a first duration, compute an engagement model for the author based on the classified counts corresponding to the predetermined time intervals and a number of the content items created by the author, determine, at a particular time in the first duration, an actual number of interactions with a particular content item created by the author and estimate, at the particular time for a second duration, a number of interactions with the particular content item created by the author based on the engagement model and the determined actual number of interactions with the particular content item.

The user interactions can include a user reading the particular content item, the user selecting the particular content item, the user sharing the particular content item, the user commenting on the particular content item, or the user endorsing the particular content item. The second duration can be read from a memory, where the second duration corresponds to a time duration beyond which additional interactions with the particular content item are anticipated to end.

The computation of the engagement model for the author comprises dividing the classified counts corresponding to the predetermined time intervals by a number of the content items created by the author. The number of content items created by the author can be read from a user account of the author from a social data repository.

The processor of the system is further configured to execute instructions to determine, at another time in the first duration following the particular time, an updated actual number of interactions with a particular content item created by the author and estimate, at the another time for the second duration, an updated number of interactions with the particular content item created by the author based on the engagement model and the determined updated actual number of interactions with the particular content item.

The processor of the system is further configured to execute the instructions to compute a popularity score for the particular content item based on the estimated number of interactions, determine a display location of the particular content item in a displayed social content stream based on the popularity score, and provide the particular content item for display in the social content stream based on the determined display location.

In some innovative implementations, the disclosed subject matter can be embodied in a method. The method comprises receiving a content item authored by an author to be displayed in a stream to a user via a web-based application, determining respective weights for one or more social profile feature scores in a feature score matrix associated with the user, the weights based on a function of social value matrices and the feature score matrix, the social value matrices including respective social value scores related to the user, estimating, for the user, at least one of a freshness value, an affinity value or a popularity value for the received content item by multiplying the social profile feature scores in the feature score matrix with the determined respective weight and providing the received content item for display based on the estimated freshness value, the estimated affinity value or the estimated popularity value. The determining and the estimation can be performed when the user has performed, with the received content item, a number of interactions less than a predetermined threshold level number of interactions.

The feature score matrix comprises a plurality of rows and columns. The rows can represent users and the columns can represent social features of respective users. The social value matrices can be single column matrices comprising a plurality of rows, each row including a freshness value, an affinity value or a popularity value associated with one or more users.

The social value scores comprise at least one of a stored freshness value, stored affinity value or stored popularity value for the user. The affinity value can be based on a number of communication sessions between the author and the user. The popularity value can be based on a total count of user interactions may be determined for the content item. The freshness value can be based a length of time that has elapsed since the content item was published by the author. The social profile feature scores can be based on a gender of the user, age group of the user, country of origin of the user, location of the user, number of social user accounts followed by the user, a number of social user accounts following the user or a number of social connections of the user.

In some innovative implementations, the disclosed subject matter can be embodied in a machine readable medium. The machine readable medium includes instructions, which when executed by a processor, cause the processor to perform operations comprising receiving a content item authored by an author to be displayed in a stream to a user via a web-based application, determining respective weights for one or more social profile feature scores in a feature score matrix associated with the user, the weights based on a function of social value matrices and the feature score matrix, the social value matrices including respective social value scores related to the user, estimating, for the user, at least one of a freshness value, an affinity value or a popularity value for the received content item by multiplying the social profile feature scores in the feature score matrix with the determined respective weight and providing the received content item for display based on the estimated freshness value, the estimated affinity value or the estimated popularity value. The determining and the estimation can be performed when the user has performed, with the received content item, a number of interactions less than a predetermined threshold level number of interactions.

The feature score matrix comprises a plurality of rows and columns. The rows can represent users and the columns can represent social features of respective users. The social value matrices can be single column matrices comprising a plurality of rows, each row including a freshness value, an affinity value or a popularity value associated with one or more users.

The social value scores comprise at least one of a stored freshness value, stored affinity value or stored popularity value for the user. The affinity value can be based on a number of communication sessions between the author and the user. The popularity value can be based on a total count of user interactions may be determined for the content item. The freshness value can be based a length of time that has elapsed since the content item was published by the author. The social profile feature scores can be based on a gender of the user, age group of the user, country of origin of the user, location of the user, number of social user accounts followed by the user, a number of social user accounts following the user or a number of social connections of the user.

In some innovative implementations, the disclosed subject matter can be embodied in a system. The system comprises a memory comprising instructions and a processor configured to execute the instructions to receive a content item authored by an author to be displayed in a stream to a user via a web-based application, determine respective weights for one or more social profile feature scores in a feature score matrix associated with the user, the weights based on a function of social value matrices and the feature score matrix, the social value matrices including respective social value scores related to the user, estimate, for the user, at least one of a freshness value, an affinity value or a popularity value for the received content item by multiplying the social profile feature scores in the feature score matrix with the determined respective weights, and provide the received content item for display based on the estimated freshness value, the estimated affinity value or the estimated popularity value. The social value scores comprise at least one of a stored freshness value, stored affinity value or stored popularity value for the user. The processor of the system is further configured to execute the instructions to perform the determination and the estimation when the user has performed, with the received content item, a number of interactions less than a predetermined threshold level number of interactions.

The feature score matrix comprises a plurality of rows and columns. The rows can represent users and the columns can represent social features of respective users. The social value matrices can be single column matrices comprising a plurality of rows, each row including a freshness value, an affinity value or a popularity value associated with one or more users.

The social value scores comprise at least one of a stored freshness value, stored affinity value or stored popularity value for the user. The affinity value can be based on a number of communication sessions between the author and the user. The popularity value can be based on a total count of user interactions may be determined for the content item. The freshness value can be based a length of time that has elapsed since the content item was published by the author. The social profile feature scores can be based on a gender of the user, age group of the user, country of origin of the user, location of the user, number of social user accounts followed by the user, a number of social user accounts following the user or a number of social connections of the user.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several configurations of the subject technology are set forth in the accompanying figures summarized below.

FIG. 3 illustrates an example feature score matrix and example social value matrices.

DETAILED DESCRIPTION

Figure 1A:
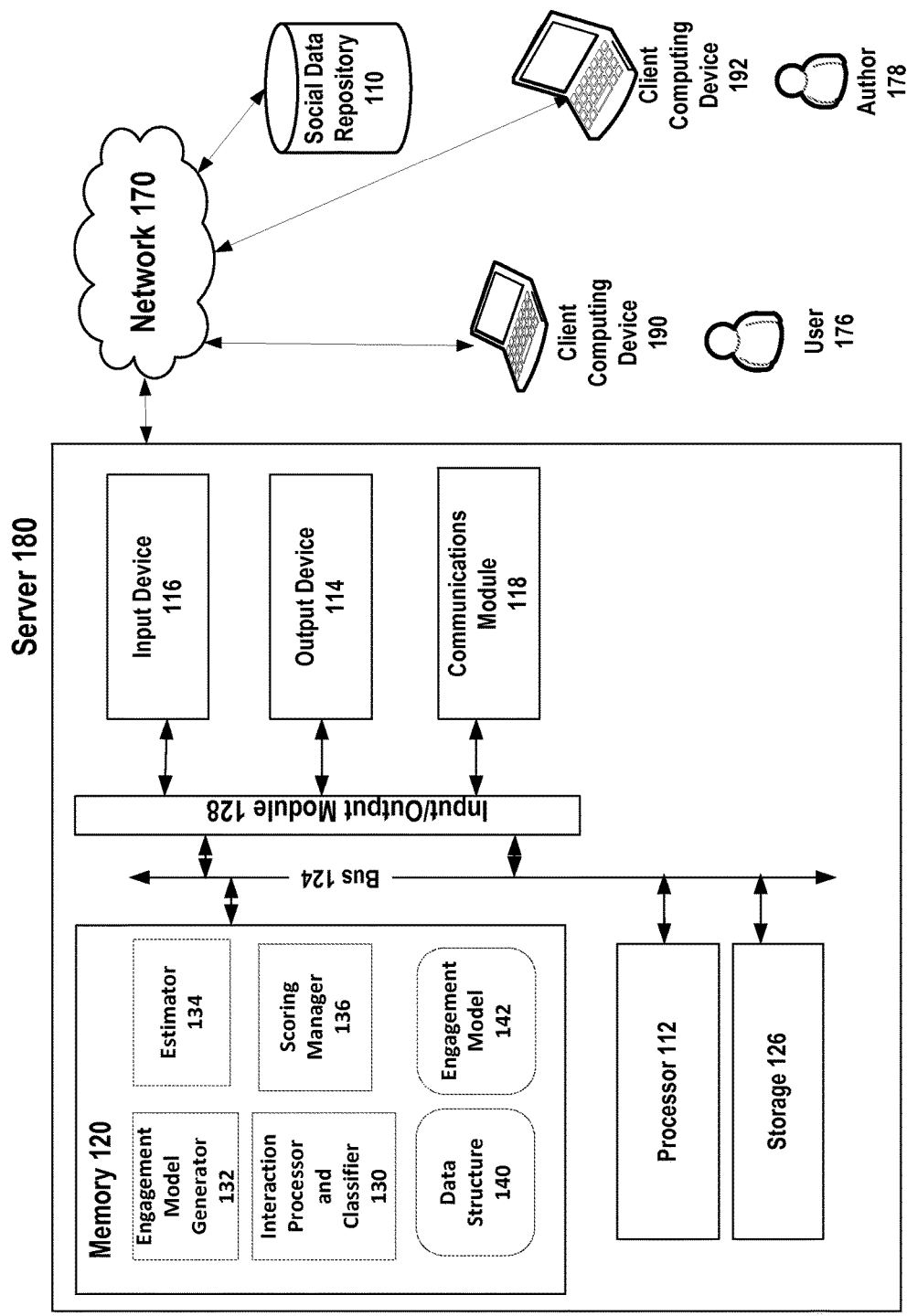
FIG. 1A is a diagram of an example device and network environment suitable for practicing some implementations of the subject technology.

The detailed description set forth below is intended as a description of various configurations of the subject technology and is not intended to represent the only configurations in which the subject technology may be practiced. The appended drawings are incorporated herein and constitute a part of the detailed description. The subject technology is not limited to the specific details set forth herein and may be practiced without these specific details.

Certain web-based applications provide information in the form of content items (e.g., social posts) authored by a variety of users. These content items can be broadcasted by populating social content streams. The content items may be typically presented in reverse chronological order on the streams, but such an arrangement of content items may not prioritize the most informative or useful information when presented to a reader of the content items. In some cases, a content item may be prioritized for presentation in a social content stream based on an actual count of user interactions with the content item. However, when scoring a content item to determine its prominence with which to show to a user, using an actual count of user interactions with the content item, either real-time or with a delay, may not be ideal. This is because the actual count of such interactions and consequently a popularity score that may be based on a ratio of actual interactions to views of the content item may not remain stable at all times of the day. For example, some users are more likely to view the content item in the morning, but can be more predisposed to interact (e.g., share, mark as favorite, etc.) with the content item in the evening. This may lead to significant fluctuations in displayed prominence of the content item during a day.

The disclosed implementations can estimate a number of interactions (e.g., post reads) with a content item for a public interaction lifetime of the content item. The estimate may be used determine an eventual popularity score of the content item and display the content item to a user at a display location in a social content stream based on the popularity score. In this way, based on the estimated number of interactions for the public interaction lifetime of the content item, the content item can be displayed to the user in the social content stream without significant display location fluctuations that may be caused when basing the display location on a popularity score that may solely vary in accordance with an actual number of interactions with the content item. Because the disclosed implementations reduce such display location fluctuations, the implementations decrease the likelihood that the content item would missed by the user as a result of such fluctuations.

Some aspects of the subject technology include storing information about users of a social networking service. For example, information may be stored indicating that a user interacted with a content item. A user about whom information is stored has the option of removing such information from storage at the social networking service. The user may be provided with an opportunity to control whether programs or features collect or share user information (e.g., information about a user's social networking parameters, a user's preferences, etc.). Thus, the user may have control over how information is collected about the user and used by a server.

FIG. 1A is a diagram illustrating example architecture for estimation of social content interactions according to some implementations of the subject technology. Server 180 includes processor 112, memory 120, storage 126, bus 124, input/output module 128, input device 116, output device 114 and communications module 118. Memory 120 includes engagement model generator 132, estimator 134, interaction processor and classifier 130, scoring manager 136, data structure 140 and engagement model 142. Server 180 may additionally include an output device (e.g., touch screen display, non-touch screen display), input device (e.g., a keyboard, touchscreen, or mouse) to receive user input. Communication module 118 can enable server 180 to send and receive data over network 150 to social data repository 110 and client computing devices 190 and 192. In some implementations server 180 can be associated with a social networking service.

In some implementations, social data repository 110 stores social content item(s) (e.g., posted content item(s)) associated with a social networking service. Social data repository 110 may also store data related to user accounts and content items that are associated with the user accounts. For example, social data repository 110 can include data indicating content items that have been viewed, shared, commented on, favored or disfavored by a user account associated with a user. Social data repository 110 may store a social connection data structure that is indicative of social connections between user accounts associated with the social networking service.

In some implementations, social data repository 110 and server 180 can communicate with one another and with client computing devices 190 and 192 via a network 150. Network 150 may include the Internet, an intranet, a local area network, a wide area network, a wired network, a wireless network, or a virtual private network (VPN). While only one data repository 110, server 180, and two client computing devices 190 and 192 are illustrated, the subject technology may be implemented in conjunction with any number of social data repositories 110, servers 180, or client computing devices 190 or 192. In some aspects, a single machine may implement the functions of social data repository 110 and server 180.

In some implementations, server 180 includes one or more modules for facilitating user interaction with a social networking service via a browser or a special purpose application executing on the client computing device 190 (or computing device 192) or for processing data stored in social data repository 110. Server 180 may be implemented as a single machine with a single processor, a multi-processor machine, or a server farm including multiple machines with multiple processors.

Client computing devices 190 and 192 can each be a laptop computer, a desktop computer, a mobile phone, a personal digital assistant (PDA), a tablet computer, a netbook, a television with one or more processors embedded therein or coupled thereto, a physical machine, or a virtual machine. Client computing devices 190 and 192 may each include one or more of a keyboard, a mouse, a display, or a touch screen. Client computing devices 190 and 192 can each include a browser configured to display webpages, for example a webpage of the social networking service. Alternatively, client computing devices 190 and 192 may include special-purpose applications (e.g., mobile phone or tablet computer applications) for accessing a social networking service.

In some implementations, author 178 may provide a content item to server 180 via client computing device 192. Author 178 may be any user who creates, publishes or shares content items for viewing by other users. For example, author 178 may access a web page or a web application of a social networking service via the client computing device 190 and publish the content item via a user account of author 178. Server 180 may store the content item in social data repository 110. Server 180 may also provide the content item for display in a social content stream displayed at client computing device 190. In some implementations, user 176 may view the content item provided by author 178 via computing device 190. For example, user 176 may access a web page or a web application of the social networking service via the client computing device 190 and view the content item in a social content stream of content items provided by server 180.

In an example overall operation, interaction processor and classifier 130 determines counts of user interactions with one or more content items created by author 178. Each user interaction of the one or more user interactions can have an associated time (e.g., 4 p.m., 10 a.m., etc.). Interaction processor and classifier 130 may classify the determined counts of the user interactions with the content items into data structure 140. The determined counts of user interactions may be classified, based on respective associated times of the user interactions, into predetermined time intervals spanning a first duration. Engagement model generator 132 may compute an engagement model 142 for author 178 based on the classified counts in data structure 140 corresponding to the predetermined time intervals and a number of the content items created by author 178.

Estimator 134 can determine, at a particular time in the first duration (e.g. 24 hour duration), an actual number of interactions with a particular content item created by author 178 and can estimate, at the particular time for a second duration (e.g., a 48 hour duration), a number of interactions with the particular content item created by the author based on engagement model 142 and the determined actual number of interactions with the particular content item. The second duration may be preset or stored in memory 120 and may be read from memory 120 by estimator 134. This second duration may be based on a heuristic that most social content items may not receive interactions or views past a certain duration (e.g., a 48 hour duration) after they are publicly available or published. Such a second duration may be referred to as, for example, a public interaction lifetime of the content item. In other words, the estimate of the interactions over the second duration determined by estimator 134 can be an estimate of a total number of interactions over a public interaction lifetime of the content item. In this way, estimator 134 may estimate the number of interactions (e.g., post reads) that may be used by scoring manager 136 to determine eventual popularity or a popularity of the content item for the public interaction lifetime of the content item. As discussed below, the content item may be displayed by scoring manager 136 to a user at a display location in a social content stream based on the estimated eventual popularity of the content item.

Scoring manager 136 may compute a popularity score for the particular content item based on the estimated number of interactions and can determine a display location of the particular content item in a displayed social content stream based on the popularity score. Scoring manger 136 can provide the particular content item for display in the social content stream based on the determined display location. As an example, the particular content item may be provided for display to user 176 at client computing device 190 when the user 176 is viewing a web application or a web page associated with a social networking service represented by social data repository 110 and server 180. Furthermore, because the second duration corresponds to a preset duration beyond which the particular content item may not receive interactions or views (e.g., a public interaction lifetime), the popularity score computed by scoring manager 136 can correspond to an eventual popularity of the particular content item. In this way, based on the estimated number of interactions for the public interaction lifetime of the content item, the content item can be displayed to the user in the social content stream without significant display location fluctuations that may be caused when basing the display location on a popularity score that may solely vary in accordance with an actual number of interactions with the content item. Because the disclosed implementations reduce such display location fluctuations, the implementations decrease the likelihood that the content item would missed by the user as a result of such fluctuations.

In some implementations, interaction processor and classifier 130 determines counts of one or more user interactions with one or more content items created by author 178. As noted above, author 178 may be any user who creates, publishes or shares content items for viewing by other users. The content items created by author 178 may include, for example, posts, social media comments, social pages, short messages, status updates, images, audio, video, multimedia or any type of social media or published content item. In other implementations, the content items created by author 178 may be published by server 180 to other users in a social network upon authorization by author 178 (e.g., selection of a publication button). The content items created by author 178 may be stored by server 180 in social data repository 110. The content items may be interacted with by other users, including, users that may be registered with the social network. Interactions by social media users, may include, but are not limited to, reads of the content items, shares of the content items and indicating the content items as favored or disfavored content items. Each user interaction of the one or more user interactions may have an associated time. For example, a first interaction with a content item created by author 178 may be received from a user at a first time (e.g., 1 p.m.) and a second interaction with the content item may be received from the same or another user at another time (e.g., 2 p.m.).

Interactions with one or more content items created by author 178 can correspond to a passive interaction type or an active interaction type. Passive interaction types include, for example, the user viewing (e.g., pausing scrolling in a stream for at least a threshold time period, e.g., 2 or 3 seconds) or selecting the content item. Active interaction types include, for example, the user re-sharing the content item, commenting on the content item, or endorsing the content item. Active interaction types can also include interaction types that are not visible to other users of the social networking service, for example, selection (e.g., click) of a uniform resource locator in a content item, selection of the content item (e.g., on a mobile device), selection of an image in the content item, or expanding the content item or a comment on the content item.

In some implementations, interaction processor and classifier 130 may classify the determined counts of the user interactions with the content items into data structure 140. The determined counts of user interactions may be classified, based on respective associated times of the user interactions, into predetermined time intervals spanning a first duration. For example, interaction processor and classifier 130 stores in data structure 140 counts of one or more user interactions determined by interaction processor and classifier 130 with one or more content items created by author 178 in accordance with associated times of the user interactions. In some implementations, interaction processor and classifier 130 may determine that interactions with the content items have occurred based on indications of the interactions stored in social data repository 110. For example, interaction processor and classifier 130 may read social data repository at predetermined intervals of time to determine if interactions with one or more content items have occurred. In some implementations, interaction processor and classifier 130 may receive notification of interactions with content items created by one or more authors from social data repository 110.

Figure 1B:
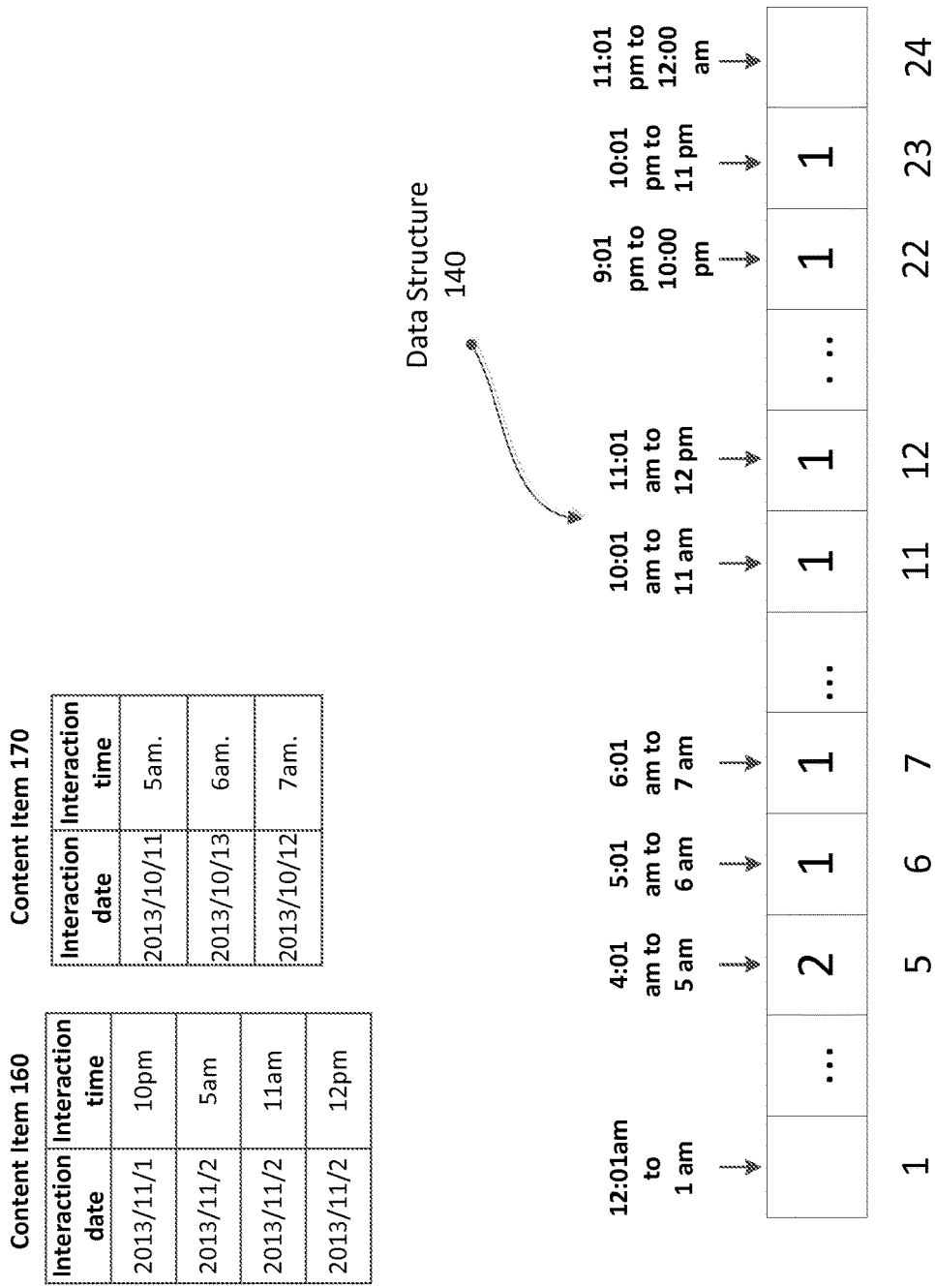
FIG. 1B illustrates an example data structure for classification of interactions.

FIG. 1B illustrates an example data structure 140 for classification of interface interactions by interaction processor and classifier 130 for example content items 160 and 170 that may have been created by author 178. In this example, content item 160 has one interaction each at 10 p.m., 5 a.m., 11 a.m. and 12 p.m. Content item 170 has one interaction each at 5 a.m., 6 a.m. and 7 a.m. In some implementations, these example counts may be determined by interaction processor and classifier 130 by reading interaction-related data stored in social media repository 110. The counts may be classified by interaction processor and classifier 130, for example, in respective 1 hour "time buckets" or time intervals in data structure 140. Such classification may include storage of the determined counts in association with their respective time intervals in data structure 140.

In some implementations, data structure 140 can be created by interaction processor and classifier 130 for a first duration that can be a 24 hour duration. As shown in FIG. 1B, data structure 140 may be a database table having one or more rows and columns. The 24 hour time duration may be divided by interaction processor and classifier 130 into 24 one-hour time intervals represented by respective data columns in the data structure 140. Each column in the data table may correspond to a time bucket or a time interval and can be associated with a respective interaction count. In other implementations, each row in the data table may correspond to a time bucket or a time interval and can be associated with a respective interaction count.

For example and with reference to FIG. 1B, content item 160 has one interaction each at 10 p.m., 5 a.m. 11 a.m. and 12 p.m. Content item 170 has one interaction each at 5 a.m., 6 a.m. and 7 a.m. These interactions may be performed on content items 160 and 170 by social network users having accounts with the social network. The social data repository 110 may store data including, but not limited to, reads, shares, endorsements, saves, etc., of content items 160 and 170 published by author 178. These counts of interactions are populated by interaction processor and classifier 130 into respective $5^{th}$, $6^{th}$, $7^{th}$, $11^{th}$, $12^{th}$ and $22^{nd}$ time buckets associated with time intervals of 4:01 a.m. to 5 a.m., 5:01 a.m. to 6 a.m., 6:01 a.m. to 7 a.m., 10:01 a.m. to 11 a.m., 11:01 a.m. to 12 p.m., and 9:01 p.m. to 10:00 p.m., respectively.

Referring to data structure 140, the $5^{th}$ slot corresponding to time interval 4:01 am to 5 am, has a stored count of two. This is because both content item 160 and content item 170 have each been interacted with once at 5 a.m. during the time interval 4:01 am to 5 am, bringing the total count of interaction for the 5$^{th}$ time bucket to 1+1 or 2. The 6$^{th}$, 7$^{th}$, 11$^{th}$, 12$^{th}$ and 22$^{nd}$ have each a stored count of 1 because there have been a total of one interaction each of content items 160 and 170 in the time intervals corresponding to these time buckets. It is to be appreciated that the structure of data structure 140 is not limited to the illustrative example of FIG. 1B and data may be stored in any other format. Furthermore, the time intervals illustrated in FIG. 1B (e.g., 4:01 am to 5 am) are purely illustrative and may be any other time intervals or time ranges spanning any duration.

In some implementations, as new interactions with content item 160 or content item 170 are determined by interaction processor and classifier 130, interaction counts stored in data structure 140 may be updated by interaction processor and classifier 130. These updates may be performed during the time duration (e.g., 24 hour duration) spanned by data structure 140. Referring to the example, shown in FIG. 1B, if interaction processor and classifier 130 determines that content item 160 has additionally been interacted with once at 10 p.m., the 22$^{nd}$ time bucket may be updated by a count of 1 to bring the total count of the 22$^{nd}$ time bucket to two. In this way, data structure 140 can include an actual number of interactions with a particular content item created by author 178 in the first duration spanned by data structure 140. In some implementations, data structure 140 may be stored in social data repository 110 in association with a social networking account associated with author 178.

In some implementations, a distinct data structure 140 may be generated for each first duration. For example, a distinct data structure 140 may be generated for each 24 hour duration. In other implementations, data structure 140 may be cleared of data after a first duration and then populated with new data by interaction processor and classifier 130 during another duration. Data structures distinct from data structure 140 may be created for authors distinct from author 178. It is to be appreciated that the implementations discussed herein may operate without or with a specification of a time zone associated with a duration of time (e.g. 24 hour duration).

In some implementations, engagement model computer 132 can compute engagement model 142 for author 178 based on the classified counts stored in data structure 140 and a total number of the content items created by author 178. In some implementations, the total number of content items published by author 178 may be determined, by engagement model computer 132, by reading social data repository 110. For example, engagement model computer 132 may access a database of user account profile data stored in social data repository 110 to determine a number of content items published by author 178.

Referring to the example illustrated in FIG. 1B, there are two content items created by author 178, namely, content item 160 and 170. Thus, in this example, the total number of content items created by author 178 is two. In some implementations, to compute engagement model 142 for author 178, engagement model computer 132 divides the interaction counts associated with one or more time intervals in data structure 140 by the total number of content items created by author 178. As an example, the content items may be created by author 178 over any time period that may be prior to the computation of the engagement value by engagement model computer 132. A count of the total number of the content items may be determined by engagement model computer 132 from social data repository 110 prior to dividing the interaction counts associated with one or more time intervals in data structure 140 by the total number of content items created by author 178. Engagement model 142 may include any other function of the classified counts stored in data structure 140 and a number of content items created by author 178.

Figure 1C:
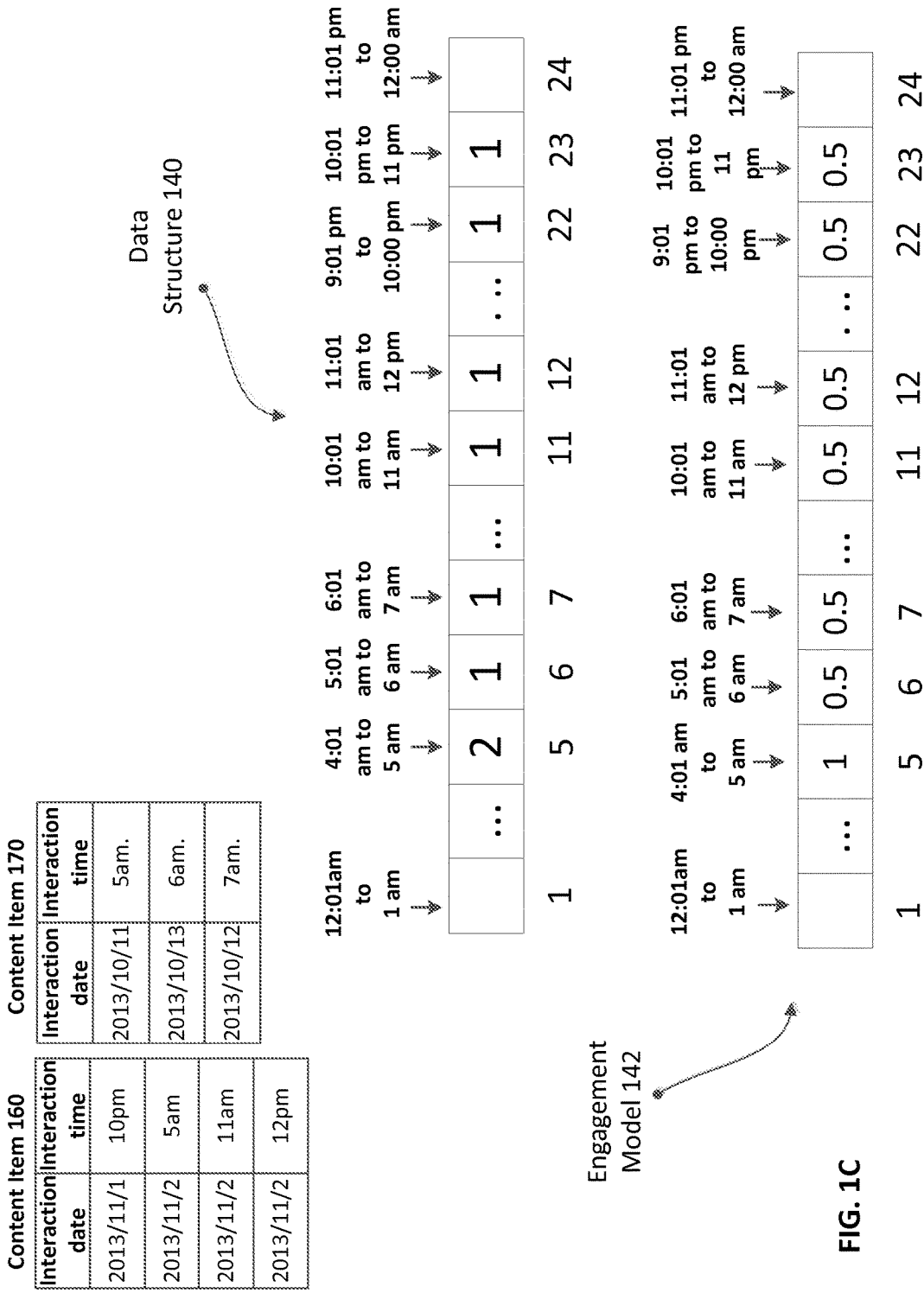
FIG. 1C illustrates an example engagement model computed using the example data structure of FIG. 1B.

FIG. 1C illustrates an example engagement model 142 that may be computed by engagement model computer 132 based on data structure 140 and a total number of content items created by author 178. In some implementations, engagement model 142 may be a data structure that is similar in construction to data structure 140. For example, engagement model 142 may be a database table having one or more rows and columns. Each column in the data table may correspond to a time bucket or a time interval and can be populated with an engagement value. In some implementations, the engagement value for a particular time interval can be computed by engagement model computer 132 by dividing the interaction count stored for the time interval in data structure 140 by the total number of content items created by author 178. As an example, the content items may be created by author 178 over any time period that may be prior to the computation of the engagement value by engagement model computer 132. A count of the total number of the content items may be determined by engagement model computer 132 from social data repository 110 prior to dividing the interaction counts associated with one or more time intervals in data structure 140 by the total number of content items created by author 178.

For example, as shown in example engagement model 142, there are, on average, 0.5 interactions in each of the 6$^{th}$, 7$^{th}$, 11$^{th}$, 12$^{th}$ and 22$^{nd}$ buckets, and one interaction in the 5$^{th}$ bucket of engagement model 142. These values can be computed by engagement model computer 132 by dividing the interaction counts stored in each of the 6$^{th}$, 7$^{th}$, 11$^{th}$, 12$^{th}$ and 22$^{nd}$ buckets by the total number of content items published by author 178. In this example, the total number of content items published by the author is 2 given that content items 160 and 170 are the two content items published by author 178. Thus, the engagement value for each of the 6$^{th}$, 7$^{th}$, 11$^{th}$, 12$^{th}$ and 22$^{nd}$ buckets is 1 divided by 2 or an engagement value of 0.5 for each of the 6$^{th}$, 7$^{th}$, 11$^{th}$, 12$^{th}$ and 22$^{nd}$ buckets. For the 5$^{th}$ bucket, the engagement value is 2 divided by 2 or 1. This example is purely illustrative and is not intended to limit the embodiments.

If for example, engagement model computer 132 determines that author 178 has published three content items, the engagement value for each of the 6$^{th}$, 7$^{th}$, 11$^{th}$, 12$^{th}$ and 22$^{nd}$ buckets is one divided by three. In a similar manner, if the engagement model computer 132 determines that author 178 has published n content items the engagement value for each of the 6$^{th}$, 7$^{th}$, 11$^{th}$, 12$^{th}$ and 22$^{nd}$ buckets is one divided by n. Thus, as an example, engagement model computer 132 can divide interaction counts stored in time buckets of data structure 140 by a total number of content items published by author 178 to compute engagement model 142.

In some implementations, a data structure corresponding to engagement model 142 may be instantiated by engagement model computer 132. Then, as engagement values for one or more time buckets are computed by engagement model computer 132, by reading interaction counts stored in data structure 140 and dividing the counts by a number of content items published by author 178, the computed engagement values are populated in the data structure corresponding to the engagement model 132. In this way, for example, engagement model 142 may be computed by engagement model computer 132.

In some implementations, engagement model 142 may be stored in social data repository 110 in association with a social networking account associated with author 178.

In some implementations, a distinct engagement model 142 may be generated for each first duration. For example, a distinct engagement model 142 may be generated for each 24 hour duration. In other implementations, engagement model 142 may be cleared of data after a first duration and then populated with new data by engagement model computer 132 for another duration. Different engagement models may be created for respective authors.

In some implementations, estimator 134 determines, at a particular time in the first duration (e.g., 24 hour duration), an actual number of interactions with a particular content item created by author 178 and then estimates, at the particular time for a second duration (e.g., 48 hour duration), a number of interactions with the particular content item created by author 178 based on engagement model 142 and the determined actual number of interactions with the particular content item. As noted above, the second duration may be preset or stored in memory 120 and may be read from memory 120 by estimator 134. The second duration may be based on a heuristic that most social content items may not receive interactions or views past a certain duration (e.g., a 48 hour duration) after they are publicly available or published. Such a second duration may be referred to, for example, as a public interaction lifetime of the content item. In other words, the estimate of the interactions over the second duration determined by estimator 134 can be an estimate of a total number of interactions over a public interaction lifetime of the content item. In this way, estimator 134 may estimate the number of interactions (e.g., post reads) that may be used by scoring manager 136 to determine eventual popularity or a popularity of the content item for the public interaction lifetime of the content item. The content item may be displayed by scoring manager 136 to a user at a display location in a social content stream based on the estimated eventual popularity of the content item.

In some implementations, at a particular time (e.g., 5 p.m.), estimator 134 may determine the actual number of interactions with a particular content item created by author 178 by reading the actual number of interactions that may be stored by interaction processor and classifier 130 in data structure 140. When a new content item (e.g., new post) is published by author 178, estimator 134 estimates a number of interactions with the new content item created by the author based on engagement model 142 and the determined actual number of interactions with the particular content item. As noted above, such an estimate of the number of interactions can be an estimate of a total number of interactions over a public interaction lifetime of the content item. Such estimation by estimator 134, at the particular time (e.g., 5 p.m.) in the first duration (e.g., 24 hour duration), may be performed by extrapolating the actual number of interactions based on engagement model 142 for author 178. The extrapolation may be performed, for example, for a second duration (e.g., 48 hour duration) beyond which estimator 134 may not anticipate receiving further interactions on the new content item. Such a second duration may be preset or stored in memory 120 and may be read from memory 120 by estimator 134 for the extrapolation. This second duration may be based on a heuristic that most social content items may not receive interactions or views past a certain duration (e.g., a 48 hour duration) after they are publicly available or published.

For example, consider a scenario where author 178 publishes a new social content item that at 4 a.m. and has no interactions with the new social content item by other users. Based on engagement model 142, estimator 134 estimates for a 24 hour duration, the new social content item may have 3.5 interactions in total. This number may be determined by estimator 134 by summarizing the engagement values in time buckets following the time bucket corresponding to the 4 a.m. bucket. These time buckets include the $6^{th}$, $7^{th}$, $11^{th}$, $12^{th}$ and $22^{nd}$ buckets. Because the engagement value for each of the $6^{th}$, $7^{th}$, $11^{th}$, $12^{th}$ and $22^{nd}$ buckets is 0.5 and for the $5^{th}$ bucket the engagement value is 1, the summation of these values is determined by estimator 134 to be 3.5 (0.5+0.5+0.5+0.5+0.5+1=3.5). Based on an example heuristic that most social content items may not get interactions or interactions past a 48 hours duration after they are publicly available or posted, estimator 134 may further estimate that the number of interactions for such a second duration would be seven (3.5 for a 24 hour duration, 2×3.5 for 48 hour duration). Thus, at 4 a.m., when author 178 publishes a new social content item, estimator 134 determines that an eventual number of interactions on the content item would be seven even before the content item has encountered any interaction from users. As will be discussed further below, scoring manager 136 can determine a popularity score for the new social content item based on the eventual number of interactions for the content item estimated by estimator 134 and even before the content item has encountered any interaction from users. In this way, the new social content item can be displayed to a user (e.g., user 176) in a social content stream without significant fluctuations in displayed prominence of the content item while decreasing the likelihood of the content item being missed by the user.

In some implementations, engagement model computer 132 determines, at another time (e.g., 5 a.m.) in the first duration (e.g., 24 hour duration) following a time at which an actual number of interactions with a particular content item were first determined (e.g., 4 a.m.), an updated actual number of interactions with a particular content item created by the author 178. Estimator 134 may then estimate, at the another time for the second duration, an updated number of interactions with the particular content item created by author 178 based on engagement model 142 and the determined updated actual number of interactions with the particular content item.

Returning to the example noted above, consider that at 5 a.m. (an hour after the content item was published at 4 a.m. by author 178) the actual number of interactions on the new social content item is determined by interaction processor and classifier 130 to be 2. The actual number of interactions may be updated by interaction processor and classifier 130 in data structure 140. Based on a current engagement model 142 for author 178, estimator 134 determines that on average, author 178's content items have been interacted with once by 5 a.m. However, the number of actual interactions at 5 a.m. is two and double of the corresponding engagement value stored in engagement model 142. Based on an example heuristic that most social content items may not get interactions or interactions past a 48 hours duration after they are publicly available or published, estimator 134 may further estimate that the number of interactions for such a second duration would be 14. This can be determined by estimator 134 as $(2/1)*(1+0.5+0.5+0.5+0.5+0.5)*2)$. In other words, 3.5 interactions are estimated by estimator 134 for a 24 hour duration and 2×2×3.5 interactions are estimated by estimator 134 for a 48 hour duration. Thus, at 5 a.m., an hour after author 178 publishes a new social content item, estimator 134 estimates that an eventual number of interactions on the content item would be 14 even before the content item has encountered any interaction from users. In this way, estimator 134 may update the estimated number of interactions (e.g., update from 7 interactions to 14 interactions) based on additional interactions that may be received at the content item created by author 178.

In some implementations, estimator 134 can apply an extrapolation process throughout the first duration (e.g., 24 hour duration) as interaction processor and classifier 130 determines a number of actual interactions, to refine the estimation for the eventual number of interactions. It is to be appreciated that the 24 hours and 48 hour durations are purely illustrative and are not intended to limit the invention. Any other time durations may be used by the implementations.

In some implementations, scoring manager 136 computes a popularity score for the particular content item based on the estimated number of interactions. Based on the computed popularity score, scoring manager 136 determines a display location of the particular content item in a displayed social content stream and provides the particular content item for display in the social content stream based on the determined location. In some implementation, the social content stream including the content item may be displayed at client 190. A user may interact with the content item via the displayed content stream at client 190. A count of these interactions may be determined by interaction processor and classifier 130 and stored in data structure 140.

Figure 2:
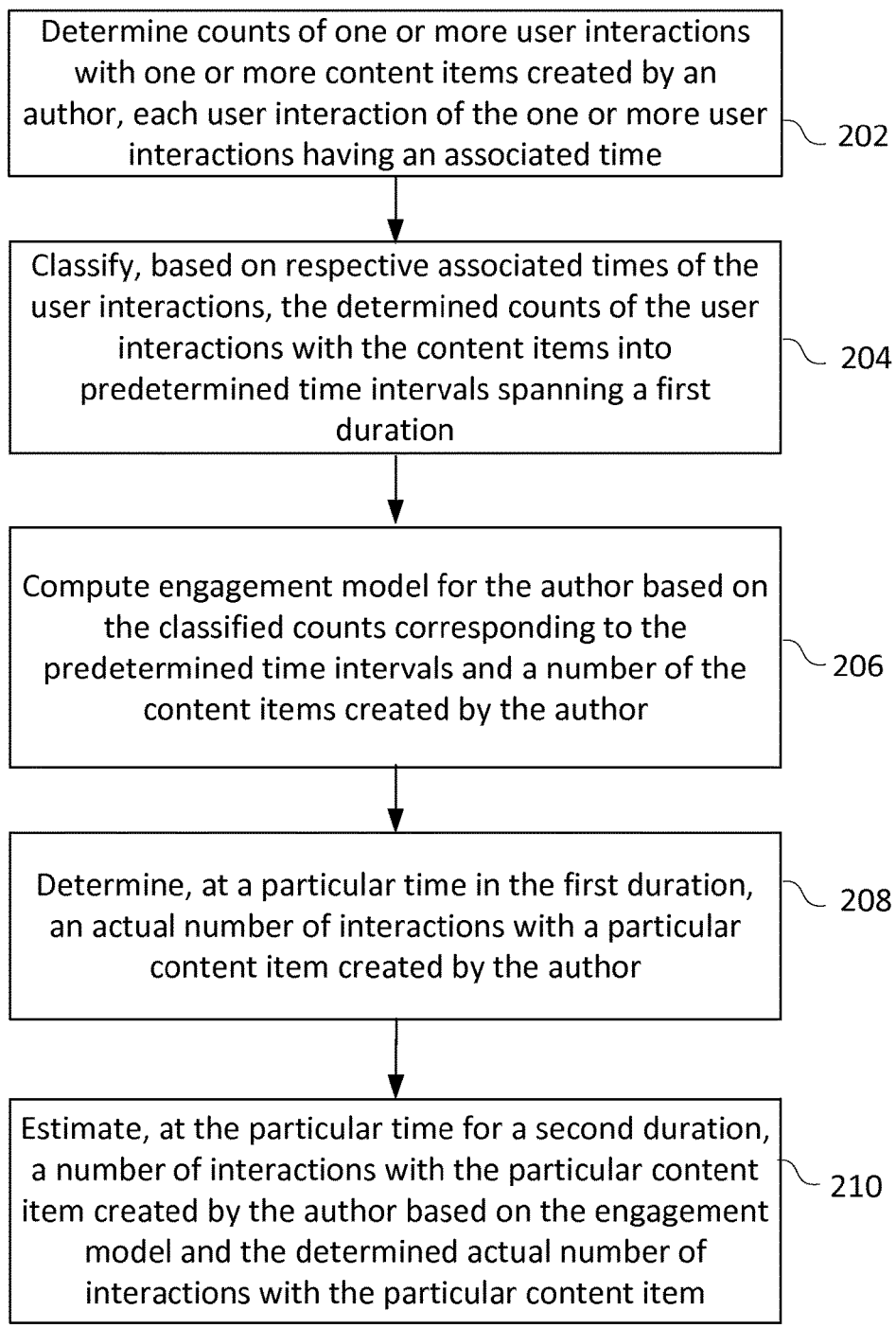
FIG. 2 illustrates an example process for practicing implementations of the subject technology using the example device of FIG. 1.

FIG. 2 illustrates an example process 200 for estimating social content interactions at the example server of FIG. 1. While FIG. 2 is described with reference to FIG. 1, it should be noted that the process steps of FIG. 2 may be performed by other systems.

Process 200 begins by determining counts of one or more user interactions with one or more content items created by an author, each user interaction of the one or more user interactions having an associated time (stage 202). As an example, interaction processor and classifier 130 determines counts of one or more user interactions with one or more content items created by author 178. Author 178 may be any user who creates, publishes or shares content items for viewing by other users.

Process 200 proceeds by classifying, based on respective associated times of the user interactions, the determined counts of the user interactions with the content items into predetermined time intervals spanning a first duration (stage 204). For example, interaction processor and classifier 130 stores in data structure 140 counts of one or more user interactions determined by interaction processor and classifier 130 with one or more content items created by author 178 in accordance with associated times of the user interactions.

An engagement model for the author is computed based on the classified counts corresponding to the predetermined time intervals and a number of the content items created by the author (stage 206). As an example, engagement model computer 132 can compute engagement model 142 for author 178 based on the classified counts stored in data structure 140 and a total number of the content items created by author 178. In some implementations, the total number of content items published by author 178 may be determined, by engagement model computer 132, by reading social data repository 110.

Process 200 proceeds by determining, at a particular time in the first duration, an actual number of interactions with a particular content item created by the author (stage 208). For example, at a particular time (e.g., 5 p.m.), estimator 134 may determine the actual number of interactions with a particular content item created by author 178 by reading the actual number of interactions that may be stored by interaction processor and classifier 130 in data structure 140.

At the particular time for a second duration, a number of interactions with the particular content item created by the author can be estimated based on the engagement model and the determined actual number of interactions with the particular content item (step 210). As an example, estimator 134 determines, at the particular time (e.g., 5 p.m.) in the first duration (e.g., 24 hour duration), an actual number of interactions with a particular content item created by author 178 and then estimates, at the particular time for a second duration (e.g., 48 hour duration), a number of interactions with the particular content item created by author 178 based on engagement model 142 and the determined actual number of interactions with the particular content item.

Thus, the disclosed implementations are able to estimate the number of interactions (e.g., post reads) that determine eventual prominence or popularity of the content item. The content item can be displayed to a user at a position in a social content stream based on the estimated eventual popularity of the content item. In this way, the content item can be displayed to the user in the social content stream without significant fluctuations in displayed prominence of the content item while decreasing the likelihood that the content item would missed by the user as a result of such fluctuations.

In order to display content items to users in a social content stream, the content items may need to be scored and ranked by scoring manager 136. In some cases, a scoring and ranking algorithm may reflect some amount of human editorial judgment from a designer of the algorithm. Specifically, and with reference to such a designed algorithm, scoring signals for a content item (e.g., a post) may include three orthogonal (or mutually independent) features that include freshness, affinity and popularity for the content item. The designed algorithm may include a weighting system between such orthogonal features. This weighting system is usually discovered via experimentation or user studies, and is generally tuned to satisfy the majority of users. As a result of such human judgment, the designed algorithm often may generally satisfy needs of a majority of users by showing social content relevant to the majority, while potentially leaving a smaller group of users with a less than satisfying social content stream experience.

In some implementations, one or more functions representative of a user (e.g., user U) for each of the three orthogonal features of a content item may be defined may be defined in memory 120 for use by scoring manager 136. These functions can include, for example, P_affinity(U), P_popularity(U) and P_freshness(U). P_affinity(U), P_popularity(U) and P_freshness(U) can respectively represent a user U's preference for scores of affinity, popularity and freshness of a content item.

For example, when author 178 publishes a content item that is to be displayed in a stream corresponding to a user, the content item is received by server 180. The received content item may include a time stamp. Interaction processor and classifier 140 may calculate a length of time that has elapsed since the time of the content item's time stamp. The calculation is performed as the current time minus the time indicated in the time stamp of the content item. A recentness or freshness value is determined by scoring manager 136 based on the calculated length of time.

An affinity score of the content item can be calculated by scoring manager 136. Scoring manager 136 is configured to calculate an affinity score for a pair of users in a social network based on data stored in social data repository 110. The calculated affinity score represents whether a contact is a close contact of the user (e.g., a social contact with whom the user communicates frequently). For example, the affinity score may be determined based on a number and quality of communication sessions (e.g., electronic messages, text, audio, or video chat sessions, telephone calls, etc.) between the pair of users. In some aspects, the affinity score may be normalized to a probability value, where a score above a predefined value may represent a close relationship between the pair of users (e.g., friends and family, or a content item directed by a first user to a second user).

A popularity score of the content item can be calculated by scoring manager 136 based on one or more user interactions with the content item, the associated times of the interactions and the interaction types. The popularity score may be higher if there are a large number of recent user interactions or the recent user interactions include active interactions. For example, a total count of user interactions may be determined for a content item. In some aspects, the popularity score is also taken into consideration a rate of user interactions within a recent fixed period of time (e.g., the last five hours). The popularity score of the content item may be determined based a combination of the total interaction rate and the recent interaction rate.

In some implementations, when P_affinity(U), P_popularity(U), P_freshness(U) are computed by scoring manager 136, the functions may return a value which reflects the user U's preference towards affinity, popularity and freshness scores of a content item at a given point in time. As an illustrative and non-limiting example, a value greater than 1 for a particular function can indicate that user U prefers the feature represented by the function. Conversely, a value lesser than 1 for a particular function indicates that the user U may not prefer the feature represented by the function. As an example, it may be determined upon computation of a function by scoring manager 136 that the user U expresses an equal preference for all three scores of affinity, popularity and freshness of a content item, or none of them, at the same time. As an example, if scoring manager 136 determines that a user X has P_affinity(X)=1.0, P_popularity(X)=1.2, P_freshness(X)=1.4, this may indicate that X may not have a preference (either positive or negative) for content items from close social networking connections (or high affinity content items), but has a slight preference for content items that are popular with other social networking users, and a strong preference for content items that are recent (or fresh).

In some implementations, scoring manager 136 can compute P_affinity(U) as:

$$P\_affinity(U)=1+\text{median}(E\_affinity(U))-\text{median}(R\_affinity(U)) \quad (1)$$

where E_affinity(U) is a set of affinity scores of content items that user U interacted with (e.g., favored or disfavored, shared or commented), while R_affinity(U) is a set of affinity scores of content items with which user U may have performed interactions.

In some implementations, the set of E_affinity(U) and R_affinity(U) can change with time as the user U interacts with content items. As a result, P_affinity(U) may change with time.

In a similar manner and in some implementations, scoring manager 136 can compute P_popularity(U) as:

$$P\_popularity(U)=1+\text{median}(E\_popularity(U))-\text{median}(R\_popularity(U)) \quad (2)$$

where E_popularity (U) is a set of popularity scores of all content items that U interacted with (e.g., favored or disfavored, shared or commented), while R_popularity (U) is a set of popularity scores of content items with which user U may have performed interactions.

In a similar manner and in some implementations, scoring manager 136 can compute P_freshness(U) as:

$$P\_freshness(U)=1+\text{median}(E\_freshness(U))-\text{median}(R\_freshness(U)) \quad (3)$$

where E_freshness (U) is a set of freshness scores of content items that U interacted with (e.g., favored or disfavored, shared or commented), while R_freshness (U) is a set of freshness scores of content items with which user U may have performed interactions.

Such computations for P_affinity(U), P_popularity(U), P_freshness(U) performed by scoring manager 136 may reflect the user's U preference with increasing accuracy as user U performs an increasing number interactions on one or more social content items (e.g., reading and engaging on content items). However, in cases where the user has not performed interactions or performed interactions that are greater than a predetermined threshold stored in memory 120, the computations for P_affinity(U), P_popularity(U), P_freshness(U) by scoring manager 136 may not reflect user's U preference with sufficient accuracy.

To address this scenario, and in some implementations, scoring manager 136 can estimate P_affinity(U), P_popularity(U), P_freshness(U) based on a generalized model. The generalized model may be determined by scoring manager 136 based on a profile of user U's user account stored in social data repository 110. The estimation of P_affinity(U), P_popularity(U), P_freshness(U) can be performed by scoring manager 136 even when user U may have performed no interactions with one or more published content items or an amount interactions less than a threshold number of interactions that are needed to accurately determine P_affinity (U), P_popularity(U), P_freshness(U).

In some implementations, estimator 134 receives a content item authored by an author to be displayed in a stream to a user via a web-based application. Estimator 134 can determine respective weights for one or more social profile feature scores in a feature score matrix associated with the user. The weights may be determined by the estimator based on a function of social value matrices and the feature score matrix. The social value matrices may include respective social value scores related to the user. Estimator 134 then estimates, for the user, at least one of a freshness value, an affinity value or a popularity value for the received content item by multiplying the social profile feature scores in the feature score matrix with the determined respective weights. Scoring manger 136 may then provide the received content item for display based on the estimated freshness value, the estimated affinity value or the estimated popularity value. In some implementations, scoring manager 136 may determine a location of the content item in a content stream that is provided to a user via client device 190. For example, scoring manager 136 may determine the location in the content stream relative to other content items in the stream. In some implementations, such a location may correspond to a location that is different from a chronological position of the content item with respect to other content items in the stream. However, the location of the content item determined by scoring manager 136 may result in a stream of content items that prioritizes the most informative or useful information when presented to a reader of the content items based on the estimated freshness value, the estimated affinity value or the estimated popularity value.

FIG. 3 illustrates an example feature score matrix 382 with social features of gender, age and number of friends for User 1, User 2 and User 3. In some implementations, feature score matrix 382 may include social feature scores of user accounts stored in social data repository 110. In some implementations, feature score matrix 382 may be a data structure that includes one or more rows and columns. Each row in feature score matrix 382 may have scores of a user's social features. For example, and with reference to FIG. 3, User 1 may have social features that include "Male, Age 25, 500 friends." This information may be represented in a row in feature score matrix 382 as "1, 0, 25, 500." In some implementations, feature score matrix 382 (e.g., feature matrix A) for all known users in a social network may be read by estimator 134 from social data repository 110. Each row in feature matrix 382 may include feature scores of a particular user's social features. Such social features may include, but are not limited to, gender, age group, country of origin, preferred language, number of social user accounts followed, number of social user accounts following the user, number of social connections, frequency of visits to a social network represented by social data repository 110, time of day of a current visit to the social network, day of week of current visit, or any other social parameter, etc.

Additionally, as illustrated in examples in FIG. 3, three single column matrices (or vectors) 384A, B and C may be defined by estimator 134 in memory 120 based on the three orthogonal features P_affinity(U), P_popularity(U), P_freshness(U). In some implementations, estimator 134 may determine weights of the social profile features of user U using the social vectors and the feature matrix 382. These weights may include, but are not limited to, W_affinity(U), W_popularity(U) and W_freshness(U).

In some implementations, for a user U, for whom P_affinity(U) cannot be appropriately determined, estimator 134 may multiply the scores of the user's profile features from feature matrix 382 (or feature matrix A) with the corresponding W_affinity for the user to arrive at an estimate for the user's P_affinity(U). For example, estimator 134 may use compute A*W_affinity(U)=P_affinity (U) to determine P_affinity(U). In a similar manner, W_popularity and W_freshness may be used by estimator 134 to estimate P_popularity(U) and P_freshness(U), respectively. Accordingly, estimator 134 may compute A*W_popularity(U) =P_popularity (U), and A*W_freshness(U)=P_freshness (U), where A represents feature score matrix 382.

The estimated preferences may then be provided to a scoring function executed by scoring manager 136 to rank a content item within a content stream for display to the user. It is to appreciated that estimator 134 may perform any function other than multiplication of the scores of the user's profile features from feature matrix 382 (or feature matrix A) with the corresponding W_affinity for the user to arrive at an estimate for the user's P_affinity(U). The matrices and vectors illustrated in FIG. 3 are purely illustrative and are not intended to limit the implementations.

In some implementations, scoring manager 136 may score and then rank a content item within a content stream for display to the user. As an illustrative example, a score for a content item may be determined by multiplying an estimated preference (e.g., P_affinity(U), P_popularity(U), P_freshness(U)) with respective affinity, popularity and freshness scores computed by scoring manager 136. For example, if scoring manger 136 scores a content item as F(freshness) *G(affinity)*H(popularity), where F, G and H are transformation functions in addition to the freshness, affinity and popularity scores of a content item, then an example scoring function used by scoring manager 136 can be:

$$F(\text{freshness}*P\_\text{freshness}(U))*G(\text{affinity}*P\_\text{affinity}(U))*H(\text{popularity}*P\_\text{popularity}(U)) \quad (4)$$

Figure 4:
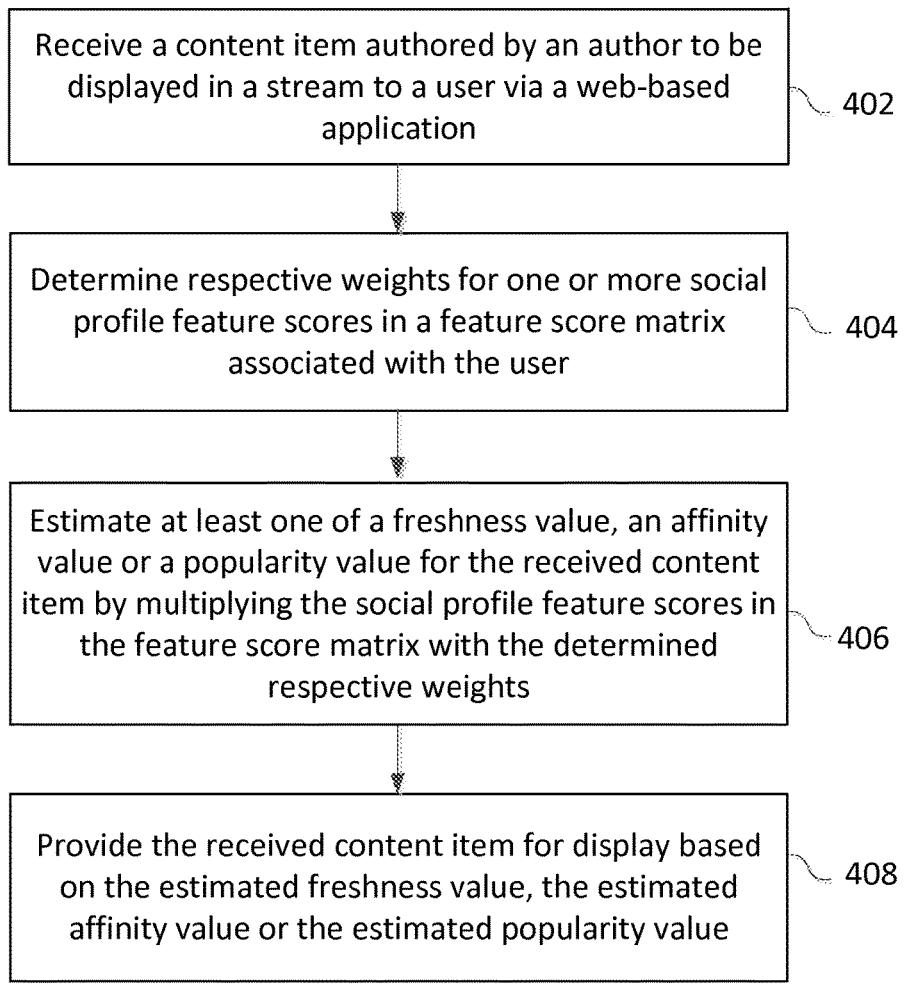
FIG. 4 illustrates another example process for practicing implementations of the subject technology using the example device of FIG. 1.

FIG. 4 illustrates an example process 400 for estimating social content interactions at the example server of FIG. 1. While FIG. 4 is described with reference to FIG. 1, it should be noted that the process steps of FIG. 4 may be performed by other systems.

Process 400 begins with receiving a content item authored by an author to be displayed in a stream to a user via a web-based application (stage 402). As an example a content item may be received at server 190 from author 178 via client computing device 192.

Process 400 proceeds by determining respective weights for one or more social profile feature scores in a feature score matrix associated with the user (stage 404). As an example, estimator 134 can determine respective weights (e.g., W_affinity(U), W_popularity(U) and W_freshness(U)) for one or more social profile feature scores in feature score matrix 382 associated with the user. The weights may be determined by estimator 134 based on a function of social value matrices 384A-N and the feature score matrix 382. The weights may be based on a function of social value matrices 384A-N and the feature score matrix 382. The social value matrices can include respective social value scores related to the user.

Then, for the user, at least one of a freshness value, an affinity value or a popularity value for the received content item is estimated by multiplying the social profile feature scores in the feature score matrix with the determined respective weights (stage 406). As an example, estimator 134 may multiply the scores of the user's profile features from feature matrix 382 (or feature matrix A) with the corresponding W_affinity for the user to arrive at an estimate for the user's P_affinity(U). In a similar manner, W_popularity and W_freshness may be used by estimator 134 to estimate P_popularity(U) and P_freshness(U), respectively.

The received content item is provided for display based on the estimated freshness value, the estimated affinity value or the estimated popularity value (stage 408). As an example, scoring manager 136 may score and then rank the content item in the stream based on the estimated freshness value, the estimated affinity value or the estimated popularity value for display to the user 176 at client computing device 190.

Returning to FIG. 1, in certain aspects, server 180 may be implemented using hardware or a combination of software and hardware, either in a dedicated server, or integrated into another entity, or distributed across multiple entities.

Server 180 includes a bus 124 or other communication mechanism for communicating information, and processor 112 coupled with bus 124 for processing information. Processor 112 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Server 180 can include, in addition to hardware, code that creates an execution environment for the computer program in question, e.g., code that constitutes processor firmware, a protocol stack, a database management system, an operating system, or a combination of one or more of them stored in memory 120. Memory 120 may include Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 124 for storing information and instructions to be executed by processor 112. The processor 112 and the memory 120 can be supplemented by, or incorporated in, special purpose logic circuitry.

The instructions may be stored in the memory 120 and implemented in one or more computer program products, i.e., one or more modules of computer program instructions encoded on a computer readable medium for execution by, or to control the operation of, the server 180, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 120 may also be used for storing temporary variable or other intermediate information during execution of instructions to be executed by processor 112.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Server 180 further includes a data storage device 126 such as a magnetic disk or optical disk, coupled to bus 124 for storing information and instructions. Server 180 may be coupled via input/output module 128 to various devices. The input/output module 128 can be any input/output module. Example input/output modules 128 include data ports such as USB ports. The input/output module 128 is configured to connect to a communications module 118. Example communications modules 118 (e.g., communications module 118 and 238) include networking interface cards, such as Ethernet cards and modems. In certain aspects, the input/output module 128 is configured to connect to a plurality of devices, such as an input device 116 and/or an output device 114. Example input devices 114 include a keyboard and a pointing device, e.g., a mouse or a trackball, by which a user can provide input to the server 180. Other kinds of input devices 114 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 116 include display devices, such as a LED (light emitting diode), CRT (cathode ray tube), or LCD (liquid crystal display) screen, for displaying information to the user.

According to one aspect of the present disclosure, server 180 can be implemented using a server 180 in response to processor 112 executing one or more sequences of one or more instructions contained in memory 120. Such instructions may be read into memory 120 from another machine-readable medium, such as data storage device 126. Execution of the sequences of instructions contained in main memory 120 causes processor 112 to perform the process blocks described herein. One or more processors in a multi-processing arrangement may also be employed to execute the sequences of instructions contained in memory 120. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 170) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Server 180 can be, for example, and without limitation, a desktop computer, laptop computer, or tablet computer. Server 180 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 112 for execution. Such a medium may take many forms, including, but not limited to, non-volatile media and volatile media. Non-volatile media include, for example, optical disks, magnetic disks, or flash memory, such as data storage device 126. Volatile media include dynamic memory, such as memory 120. Transmission media include coaxial cables, copper wire, and fiber optics, including the wires that comprise bus 124. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

The subject technology is illustrated, for example, according to various aspects described below. Various examples of aspects of the subject technology are described as numbered clauses (1, 2, 3, etc.) for convenience. These are provided as examples, and do not limit the subject technology.

1. A method comprising:
    determining counts of one or more user interactions with one or more content items created by an author, each user interaction of the one or more user interactions having an associated time;
    classifying, based on respective associated times of the user interactions, the determined counts of the user interactions with the content items into predetermined time intervals spanning a first duration;
    computing an engagement model for the author based on the classified counts corresponding to the predetermined time intervals and a number of the content items created by the author;
    determining, at a particular time in the first duration, an actual number of interactions with a particular content item created by the author; and
    estimating, at the particular time for a second duration, a number of interactions with the particular content item created by the author based on the engagement model and the determined actual number of interactions with the particular content item.

2. The method of clause 1, further comprising:
    determining, at another time in the first duration following the particular time, an updated actual number of interactions with a particular content item created by the author; and
    estimating, at the another time for the second duration, an updated number of interactions with the particular content item created by the author based on the engagement model and the determined updated actual number of interactions with the particular content item.

3. The method of clause 1, further comprising:
    computing a popularity score for the particular content item based on the estimated number of interactions;
    determining a display location of the particular content item in a displayed social content stream based on the popularity score; and
    providing the particular content item for display in the social content stream based on the determined location.

4. The method of clause 1, wherein the user interactions include a user reading the particular content item, the user selecting the particular content item, the user sharing the particular content item, the user commenting on the particular content item, or the user endorsing the particular content item.

5. The method of clause 1, further comprising reading the second duration from a memory, wherein the second duration corresponds to a time duration beyond which additional interactions with the particular content item are anticipated to end.

6. The method of clause 1, wherein the computing the engagement model for the author comprises dividing the classified counts corresponding to the predetermined time intervals by a number of the content items created by the author.

7. The method of clause 6, further comprising reading the number of content items created by the author from a user account of the author from a social data repository.

8. A machine-readable medium comprising instructions stored therein, which when executed by a processor, causes the processor to perform operations comprising:
    determining counts of one or more user interactions with one or more content items created by an author, each user interaction of the one or more user interactions having an associated time;
    classifying, based on respective associated times of the user interactions, the determined counts of the user interactions with the content items into predetermined time intervals spanning a first duration;
    computing an engagement model for the author based on the classified counts corresponding to the predetermined time intervals and a number of the content items created by the author;
    determining, at a particular time in the first duration, an actual number of interactions with a particular content item created by the author; and
    estimating, at the particular time for a second duration, a number of interactions with the particular content item created by the author based on the engagement model and the determined actual number of interactions with the particular content item.

9. The machine readable medium of clause 8, further comprising:
    determining, at another time in the first duration following the particular time, an updated actual number of interactions with a particular content item created by the author; and
    estimating, at the another time for the second duration, an updated number of interactions with the particular content item created by the author based on the engagement model and the determined updated actual number of interactions with the particular content item.

10. The machine readable medium of clause 8, further comprising:
    computing a popularity score for the particular content item based on the estimated number of interactions;
    determining a display location of the particular content item in a displayed social content stream based on the popularity score; and
    providing the particular content item for display in the social content stream based on the determined location.

11. The machine readable medium of clause 8, further wherein the user interactions include a user reading the particular content item, the user selecting the particular content item, the user sharing the particular content item, the user commenting on the particular content item, or the user endorsing the particular content item.

12. The machine readable medium of clause 8, further comprising reading the second duration from a memory, wherein the second duration corresponds to a time duration beyond which additional interactions with the particular content item are anticipated to end.

13. The machine readable medium of clause 8, wherein the computing the engagement model for the author comprises dividing the classified counts corresponding to the predetermined time intervals by a number of the content items created by the author.
14. The machine readable medium of clause 8, further comprising reading the number of content items created by the author from a user account of the author from a social data repository.
15. A system comprising:
    a memory comprising instructions; and
    a processor configured to execute the instructions to:
    determine counts of one or more user interactions with one or more content items created by an author, each user interaction of the one or more user interactions having an associated time;
    classify, based on respective associated times of the user interactions, the determined counts of the user interactions with the content items into predetermined time intervals spanning a first duration;
    compute an engagement model for the author based on the classified counts corresponding to the predetermined time intervals and a number of the content items created by the author;
    determine, at a particular time in the first duration, an actual number of interactions with a particular content item created by the author; and
    estimate, at the particular time for a second duration, a number of interactions with the particular content item created by the author based on the engagement model and the determined actual number of interactions with the particular content item.
16. The system of clause 15, the processor configured to execute the instructions to:
    determine, at another time in the first duration following the particular time, an updated actual number of interactions with a particular content item created by the author; and
    estimate, at the another time for the second duration, an updated number of interactions with the particular content item created by the author based on the engagement model and the determined updated actual number of interactions with the particular content item.
17. The system of clause 15, the processor configured to execute the instructions to:
    compute a popularity score for the particular content item based on the estimated number of interactions;
    determine a display location of the particular content item in a displayed social content stream based on the popularity score; and
    provide the particular content item for display in the social content stream based on the determined location.
18. The system of clause 15, wherein the user interactions include a user reading the particular content item, the user selecting the particular content item, the user sharing the particular content item, the user commenting on the particular content item, or the user endorsing the particular content item.
19. The system of clause 15, further comprising reading the second duration from a memory, wherein the second duration corresponds to a time duration beyond which additional interactions with the particular content item are anticipated to end.
20. The system of clause 15, wherein the computing the engagement model for the author comprises dividing the classified counts corresponding to the predetermined time intervals by a number of the content items created by the author.
21. The system of clause 20, further comprising reading the number of content items created by the author from a user account of the author from a social data repository.
22. A machine-readable medium comprising instructions stored therein, which when executed by a processor, causes the processor to perform operations comprising:
    receiving a content item authored by an author to be displayed in a stream to a user via a web-based application;
    determining respective weights for one or more social profile feature scores in a feature score matrix associated with the user, the weights based on a function of social value matrices and the feature score matrix, the social value matrices including respective social value scores related to the user;
    estimating, for the user, at least one of a freshness value, an affinity value or a popularity value for the received content item by multiplying the social profile feature scores in the feature score matrix with the determined respective weights; and
    providing the received content item for display based on the estimated freshness value, the estimated affinity value or the estimated popularity value.
23. The machine-readable medium of clause 22, wherein the social value scores comprise at least one of a stored freshness value, stored affinity value or stored popularity value for the user.
24. The machine-readable medium of clause 22, wherein the determining and the estimation are performed when the user has performed, with the received content item, a number of interactions less than a predetermined threshold level number of interactions.
25. The machine-readable medium of clause 22, wherein the affinity value is based on a number of communication sessions between the author and the user.
26. The machine-readable medium of clause 22, wherein the popularity value is based on a total count of user interactions may be determined for the content item.
27. The machine-readable medium of clause 22, wherein the freshness value is based a length of time that has elapsed since the content item was published by the author.
28. The machine-readable medium of clause 22, wherein the social profile feature scores are based on a gender of the user, age group of the user, country of origin of the user, location of the user, number of social user accounts followed by the user, a number of social user accounts following the user or a number of social connections of the user.
29. The machine-readable medium of clause 22, wherein the feature score matrix comprises a plurality of rows and columns, the rows representing users and the columns representing social features of respective users.
30. The machine-readable medium of clause 22, wherein the social value matrices are single column matrices comprising a plurality of rows, each row including a freshness value, an affinity value or a popularity value associated with one or more users.
31. A system comprising:
    a memory comprising instructions; and
    a processor configured to execute the instructions to:

receive a content item authored by an author to be displayed in a stream to a user via a web-based application;

determine respective weights for one or more social profile feature scores in a feature score matrix associated with the user, the weights based on a function of social value matrices and the feature score matrix, the social value matrices including respective social value scores related to the user;

estimate, for the user, at least one of a freshness value, an affinity value or a popularity value for the received content item by multiplying the social profile feature scores in the feature score matrix with the determined respective weights; and provide the received content item for display based on the estimated freshness value, the estimated affinity value or the estimated popularity value.

32. The system of clause 31, wherein the social value scores comprise at least one of a stored freshness value, stored affinity value or stored popularity value for the user.

33. The system of clause 31, wherein the determination of the respective weights and the estimation are performed when the user has performed, with the received content item, a number of interactions less than a predetermined threshold level number of interactions.

34. The system of clause 31, wherein the social profile feature scores are based on a gender of the user, age group of the user, country of origin of the user, location of the user, number of social user accounts followed by the user, a number of social user accounts following the user or a number of social connections of the user.

35. The system of clause 31, wherein the affinity value is based on a number of communication sessions between the author and the user.

36. The system of clause 31, wherein the popularity value is based on a total count of user interactions may be determined for the content item.

37. The system of clause 31, wherein the freshness value is based a length of time that has elapsed since the content item was published by the author.

38. The system of clause 31, wherein the feature score matrix comprises a plurality of rows and columns, the rows representing users and the columns representing social features of respective users.

39. The system of clause 31, wherein the social value matrices are single column matrices comprising a plurality of rows, each row including a freshness value, an affinity value or a popularity value associated with one or more users.

40. A method comprising:

receiving a content item authored by an author to be displayed in a stream to a user via a web-based application;

determining respective weights for one or more social profile feature scores in a feature score matrix associated with the user, the weights based on a function of social value matrices and the feature score matrix, the social value matrices including respective social value scores related to the user;

estimating, for the user, at least one of a freshness value, an affinity value or a popularity value for the received content item by multiplying the social profile feature scores in the feature score matrix with the determined respective weights; and providing the received content item for display based on the estimated freshness value, the estimated affinity value or the estimated popularity value.

41. The method of clause 40, wherein the social value scores comprise at least one of a stored freshness value, stored affinity value or stored popularity value for the user.

42. The method of clause 40, wherein the determining and the estimation are performed when the user has performed, with the received content item, a number of interactions less than a predetermined threshold level number of interactions.

43. The method of clause 40, wherein the affinity value is based on a number of communication sessions between the author and the user.

44. The method of clause 40, wherein the popularity value is based on a total count of user interactions may be determined for the content item.

45. The method of clause 40, wherein the freshness value is based a length of time that has elapsed since the content item was published by the author.

46. The method of clause 40, wherein the social profile feature scores are based on a gender of the user, age group of the user, country of origin of the user, location of the user, number of social user accounts followed by the user, a number of social user accounts following the user or a number of social connections of the user.

47. The method of clause 40, wherein the feature score matrix comprises a plurality of rows and columns, the rows representing users and the columns representing social features of respective users.

48. The method of clause 40, wherein the social value matrices are single column matrices comprising a plurality of rows, each row including a freshness value, an affinity value or a popularity value associated with one or more users.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate aspects can also be implemented in combination in a single aspect. Conversely, various features that are described in the context of a single aspects can also be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A method comprising:
   determining counts of one or more user interactions with one or more content items created by an author, each user interaction of the one or more user interactions having an associated time;
   classifying, based on respective associated times of the user interactions, the determined counts of the user interactions with the content items into predetermined time intervals spanning a first duration;
   computing an engagement model for the author comprising a plurality of engagement values corresponding to the predetermined time intervals, wherein the plurality of engagement values are computed by dividing the classified counts corresponding to the predetermined time intervals by a number of the content items created by the author;
   determining, at a particular time in the first duration, an actual number of interactions with a particular content item created by the author;
   estimating, at the particular time for a second duration, an estimated number of interactions with the particular content item created by the author based on a summation of the plurality of engagement values of the engagement model and the determined actual number of interactions with the particular content item;
   computing a popularity score for the particular content item based on the estimated number of interactions;
   determining a display location of the particular content item in a displayed content stream based on the popularity score;
   and providing the particular content item for display in the displayed content stream based on the determined display location.

2. The method of claim 1, wherein the user interactions include a user reading the particular content item, the user selecting the particular content item, the user sharing the particular content item, the user commenting on the particular content item, or the user endorsing the particular content item.

3. The method of claim 1, further comprising reading the second duration from a memory.

4. The method of claim 1, further comprising reading the number of content items created by the author from a user account of the author from a social data repository.

5. The method of claim 1, further comprising:
   determining, at another time in the first duration following the particular time, an updated actual number of interactions with a particular content item created by the author;
   refining the estimated number of interactions by applying an extrapolation process throughout the first duration based on the determined updated actual number of interactions;
   computing a popularity score for the particular content item based on the refined estimated number of interactions; and
   providing the particular content item for display based on the popularity score.

* * * * *